United States Patent
Kumar et al.

(10) Patent No.: US 8,307,460 B2
(45) Date of Patent: Nov. 6, 2012

(54) METHOD AND APPARATUS FOR GETTING CONTENT INFORMATION WHEN DRM AGENT AND RENDERING APPLICATION ARE IMPLEMENTED ON SEPARATE DEVICES

(75) Inventors: Deepak Kumar, Bangalore (IN); Mithun Manjnath Nayak, Karnatak (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1370 days.

(21) Appl. No.: 11/987,847

(22) Filed: Dec. 5, 2007

(65) Prior Publication Data

US 2008/0184027 A1    Jul. 31, 2008

(30) Foreign Application Priority Data

Jan. 3, 2007    (KR) ........................ 10-2007-0000733

(51) Int. Cl.
*G06F 21/00*    (2006.01)
(52) U.S. Cl. .......................................................... 726/32
(58) Field of Classification Search .................... 713/150
See application file for complete search history.

(56) References Cited

U.S. PATENT DOCUMENTS

| | | | |
|---|---|---|---|
| 2002/0087657 A1* | 7/2002 | Hunt | 709/217 |
| 2003/0084298 A1 | 5/2003 | Messerges et al. | |
| 2005/0177873 A1* | 8/2005 | Wu et al. | 726/26 |
| 2005/0193200 A1* | 9/2005 | Akiba et al. | 713/168 |

FOREIGN PATENT DOCUMENTS

| | | |
|---|---|---|
| KR | 1020060005285 | 1/2006 |
| KR | 1020060025364 | 3/2006 |
| KR | 1020060098734 | 9/2006 |

* cited by examiner

*Primary Examiner* — Gilberto Barron, Jr.
*Assistant Examiner* — Devin Almeida
(74) *Attorney, Agent, or Firm* — NSIP Law

(57) ABSTRACT

A method and apparatus which can reduce the communication time that occurs due to transmission of an encrypted content, when a Digital Rights Management (DRM) agent and a rendering application are implemented in different devices respectively, is provided. A method of obtaining content information in an environment where a DRM agent and a rendering application are separated from each other, includes transmitting, by a consumer electronics (CE) device comprising the rendering application, first N bytes of the content to a portable Digital Rights Management (PDRM) device comprising the DRM agent, and obtaining, by the PDRM device, information about the content by using a cryptographic hash with respect to the first N bytes, and transmitting the obtained information to the CE device.

12 Claims, 3 Drawing Sheets

METHOD AND APPARATUS FOR GETTING CONTENT INFORMATION WHEN DRM AGENT AND RENDERING APPLICATION ARE IMPLEMENTED ON SEPARATE DEVICES

CROSS-REFERENCE TO RELATED APPLICATIONS

This application claims the benefit under 35 U.S.C. §119(a) of a Korean Patent Application No. 10-2007-0000733, filed on Jan. 3, 2007, in the Korean Intellectual Property Office, the entire disclosure of which is hereby incorporated by reference.

BACKGROUND OF THE INVENTION

1. Field of the Invention

The present invention relates generally to a method and apparatus to reduce communication time needed to transmit encrypted content when a Digital Rights Management (DRM) agent and a rendering application are implemented in different devices, respectively.

2. Description of Related Art

When a Digital Rights Management (DRM) agent and a rendering application are implemented in different devices, respectively, and a content file exists in a device that has the rendering application, the issue of how to perform content rendering arises.

For example, a portable Digital Rights Management (PDRM) device may be implemented on a Universal Serial Bus (USB) device which is connected to a device which implements the rendering application and stores a DRM protected content, such as a personal computer (PC), a personal digital assistant (PDA), and a mobile phone, among others.

In this instance, the rendering application may require information regarding a type/format of content for the content rendering. Accordingly, the rendering application requires the transmission of the entire content to a device that has the DRM agent. However, when transmitting the entire content, bandwidth may not be effectively utilized and thus latency may occur.

Accordingly, there is a need for an improved system and method for transmitting content so that a bandwidth is effectively utilized.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for reducing a communication time, which occurs due to transmission of an encrypted content, when a Digital Rights Management (DRM) agent and a rendering application are implemented in different devices respectively.

An aspect of exemplary embodiments of the present invention also provides a method and apparatus which can avoid traffic due to the unnecessary transmission of content between a portable Digital Rights Management (PDRM) device and a consumer electronics (CE) device and thereby effectively utilizes the bandwidth between the PDRM device and the CE device.

An aspect of exemplary embodiments of the present invention also provides a method and apparatus which can effectively reduce latency, which may occur due to content transmission time, by using a hash of a portion of the content, instead of the entire content.

According to an aspect of exemplary embodiments of the present invention, a method of obtaining content information in an environment where a Digital Rights Management (DRM) agent and a rendering application are separated from each other is provided. The method includes transmitting first N bytes of the content to a portable Digital Rights Management (PDRM) device by a consumer electronics (CE) device comprising the rendering application. The PDRM device comprises the DRM agent. The method also includes obtaining, by the PDRM device, information about the content by using a cryptographic hash with respect to the first N bytes, and transmitting the obtained information to the CE device.

According to an exemplary implementation, when the first N bytes are initially transmitted from the CE device to the PDRM device, the method may further include, transmitting, by the CE device, the content to the PDRM device upon a request of the PDRM device, obtaining, by the PDRM device, a content identifier of the content by using the content, creating a hash entry by mapping the cryptographic hash of the content with the content identifier, maintaining, by the PDRM device, a hash map table, and updating the hash map table to include the created hash entry.

According to an exemplary embodiment of the present invention, the obtaining and the transmitting may be performed when the CE device subsequently transmits the first N bytes to the PDRM device, and obtain information about the content by using the updated hash map table.

In an exemplary embodiment of the present invention, the obtaining and the transmitting may include calculating the cryptographic hash with respect to the subsequently transmitted first N bytes, and retrieving and extracting the hash entry from the hash map table by using the cryptographic hash. Also, the hash entry may be constructed as a list of the content identifier associated with the content, and the obtaining and the transmitting may include obtaining required information by using the content identifier, and transmitting the needed information to the CE device.

According to another aspect of exemplary embodiment of the present invention, an apparatus for obtaining content information in an environment where a DRM agent and a rendering application are separated from each other is provided. The apparatus includes a PDRM device for comprising the DRM agent, wherein the PDRM device includes a data receiver for receiving first N bytes of the content from a CE device comprising the rendering application, and an information obtainment unit for obtaining information about the content by using a cryptographic hash with respect to the first N bytes and transmitting the obtained information to the CE device.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
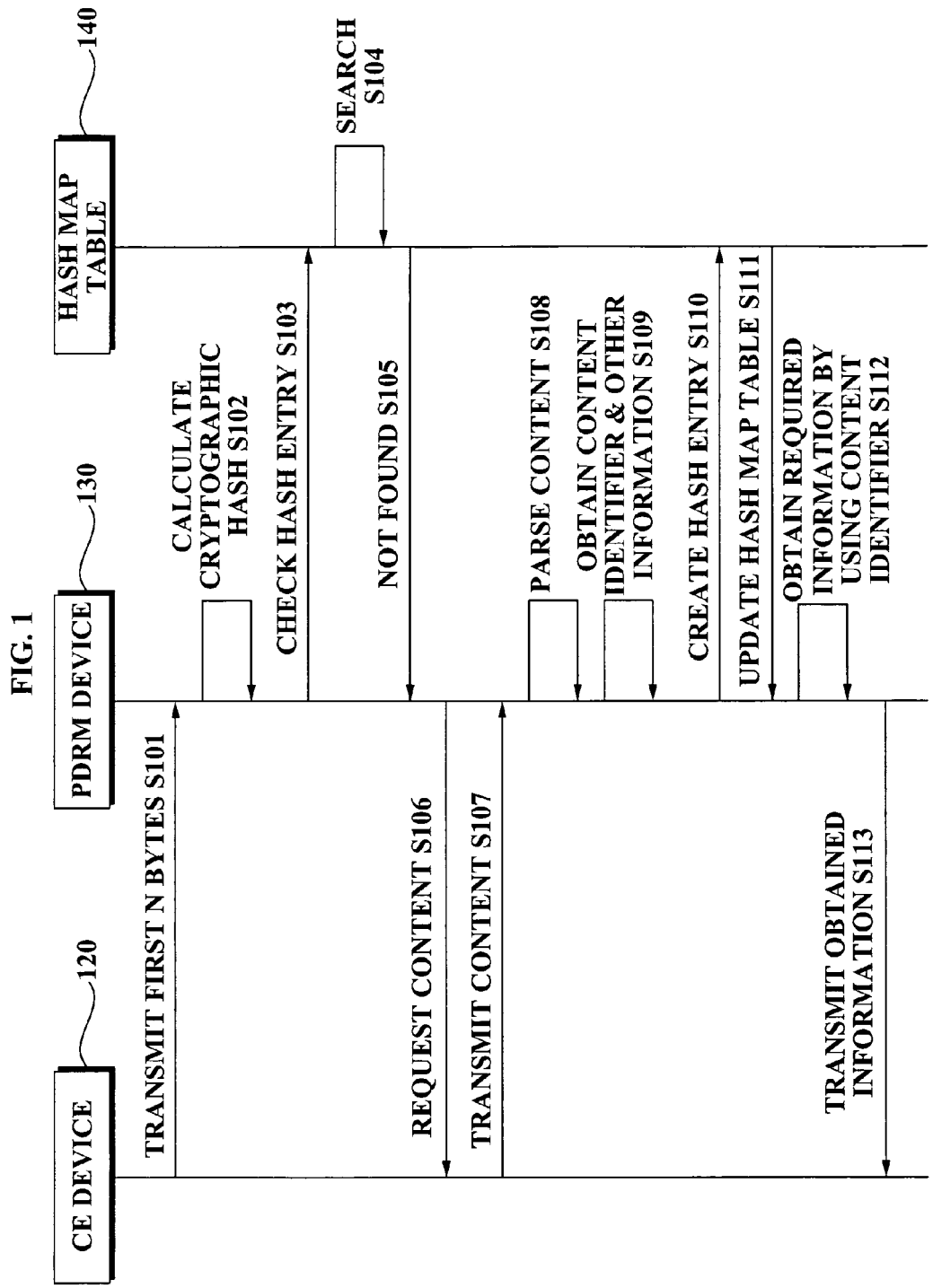
FIG. 1 is a flowchart illustrating a method of obtaining content information, performed when a CE device initially transmits first N bytes of content to a PDRM device according to an exemplary embodiment of the present invention.

FIG. 1 is a flowchart illustrating a method of obtaining content information, performed when a consumer electronics (CE) device 120 initially transmits first N bytes of content to a portable Digital Rights Management (PDRM) device 130 according to an exemplary embodiment of the present invention.

In step S101, the CE device 120 has a rendering application and transmits first N bytes of content, which requires digital rights information, to the PDRM device 130.

In step S102, the PDRM device 130 calculates a cryptographic hash with respect to the first N bytes. According to an exemplary implementation, when the first N bytes are insufficient to calculate the cryptographic hash, the PDRM device 130 obtains additional data from the CE device 120 and thereby calculates the cryptographic hash. Also, the PDRM device 130 maintains and utilizes a hash map table 140 to obtain the digital rights information.

In step S103, the PDRM device 130 verifies a hash entry from the hash map table 140.

In step S104, the PDRM device 130 searches the hash map table 140 for the hash entry.

In step S105, since the search is the first attempt to access information, the hash entry is not found in the hash map table 140.

In step S106, the PDRM device 130 requests the CE device 120 to transmit the content for the first content consumption.

In step S107, the CE device 120 transmits the content to the PDRM 130. The entire content is transmitted only when the entire content is absolutely essential, for example, when decryption of the entire content is required for the content consumption.

In steps S108 and S109, the PDRM device 130 parses the content and thereby obtains a content identifier and other information. In an exemplary embodiment of the present invention, the other information includes extracted information of <start offset, end offset> corresponding to each content identifier.

In step S110, the PDRM device 130 creates the hash entry by mapping the content identifier with a hash value of the content.

In step S111, the hash map table 140 is updated to include the created hash entry.

In step S112, the PDRM device 130 obtains required information by using the content identifier.

In step S13, the PDRM device 130 transmits the obtained information to the CE device 120.

Subsequently, when the CE device 120 requires access to content information, the CE device 120 may quickly obtain the required information by transmitting the first N bytes of the content to the PDRM device 130.

Figure 2:
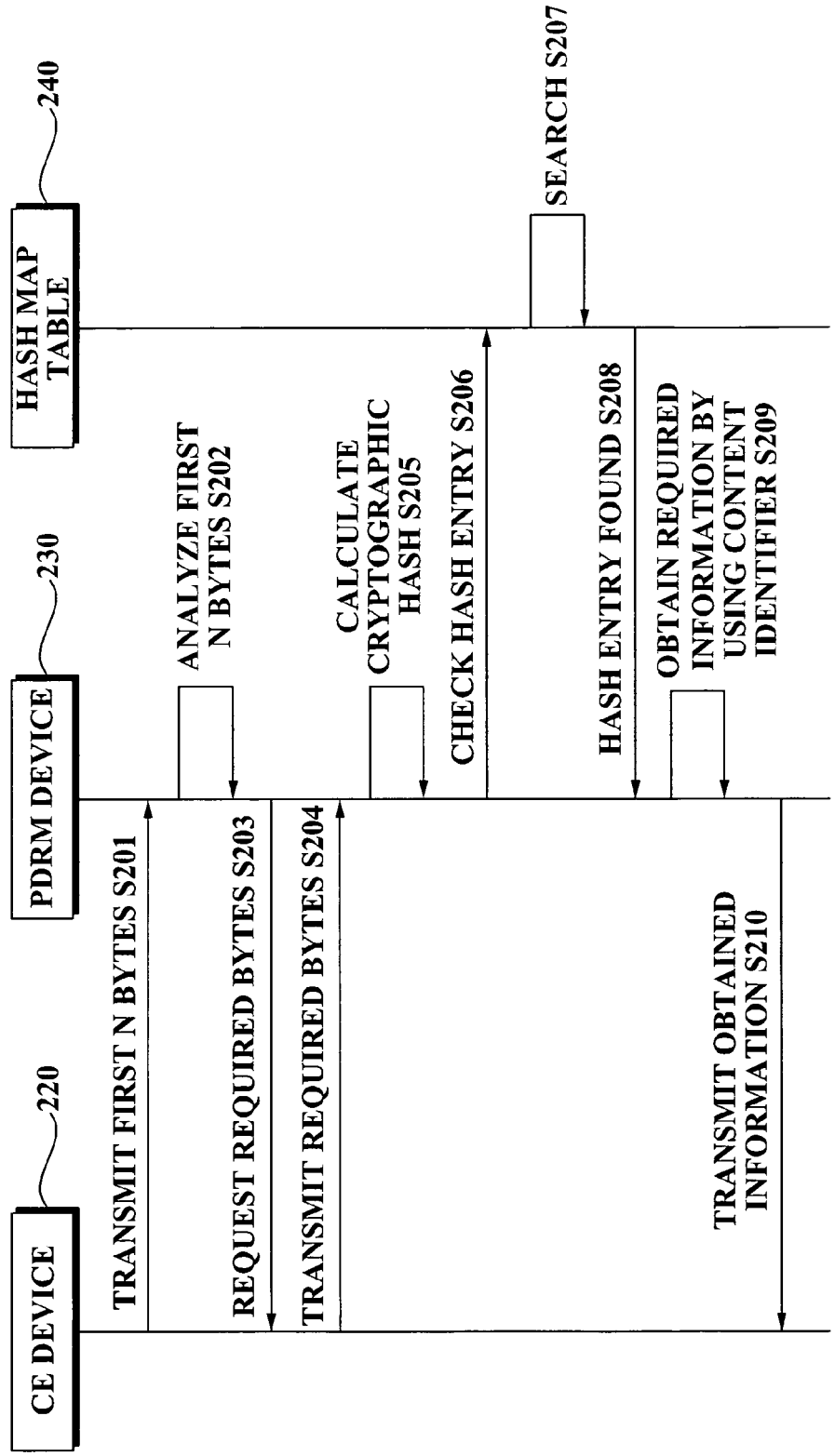
FIG. 2 is a flowchart illustrating a method of obtaining content information, performed when a CE device subsequently transmits the first N bytes of content according to the exemplary embodiment of the present invention described with reference to FIG. 1.

FIG. 2 is a flowchart illustrating a method of obtaining content information, performed when a CE device 220 subsequently transmits first N bytes of content to a PDRM device 230 according to an exemplary embodiment of the present invention.

In step S201, the CE device 220 that has a rendering application transmits first N bytes of content, which requires digital rights information, to the PDRM device 130.

In step S202, the PDRM 230 analyzes the first N bytes and determines whether the first N bytes are sufficient to calculate a cryptographic hash.

In step S203, when the first N bytes are insufficient to calculate the cryptographic hash, the PDRM device 230 makes a request to the CE device 220 for bytes which are required to calculate the cryptographic hash. The required bytes are determined by using an offset and the size of the content.

In step S204, when the request is received from the PDRM device 230, the CE device 220 transmits the required bytes to the PDRM device 230.

In step S205, the PDRM device 230 calculates the cryptographic hash.

In step S206, the PDRM device 230 verifies a hash entry from a hash map table 240.

In step S207, the PDRM device 230 searches the hash map table 240 for the hash entry.

In step S208, when the hash entry is found, the found hash entry is returned to the PDRM device 230. In this instance, the hash entry corresponds to a list of content identifiers associated with the content.

In step S209, the PDRM device 230 obtains the required information by using the content identifier.

In step S210, the PDRM device 230 transmits the obtained information to the CE device 220.

The present invention can also be embodied as computer-readable media including program instructions to implement various operations embodied by a computer. The media may also include, alone or in combination with the program instructions, data files, and data structures, among others. Examples of computer-readable media include, but are not limited to, magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Figure 3:
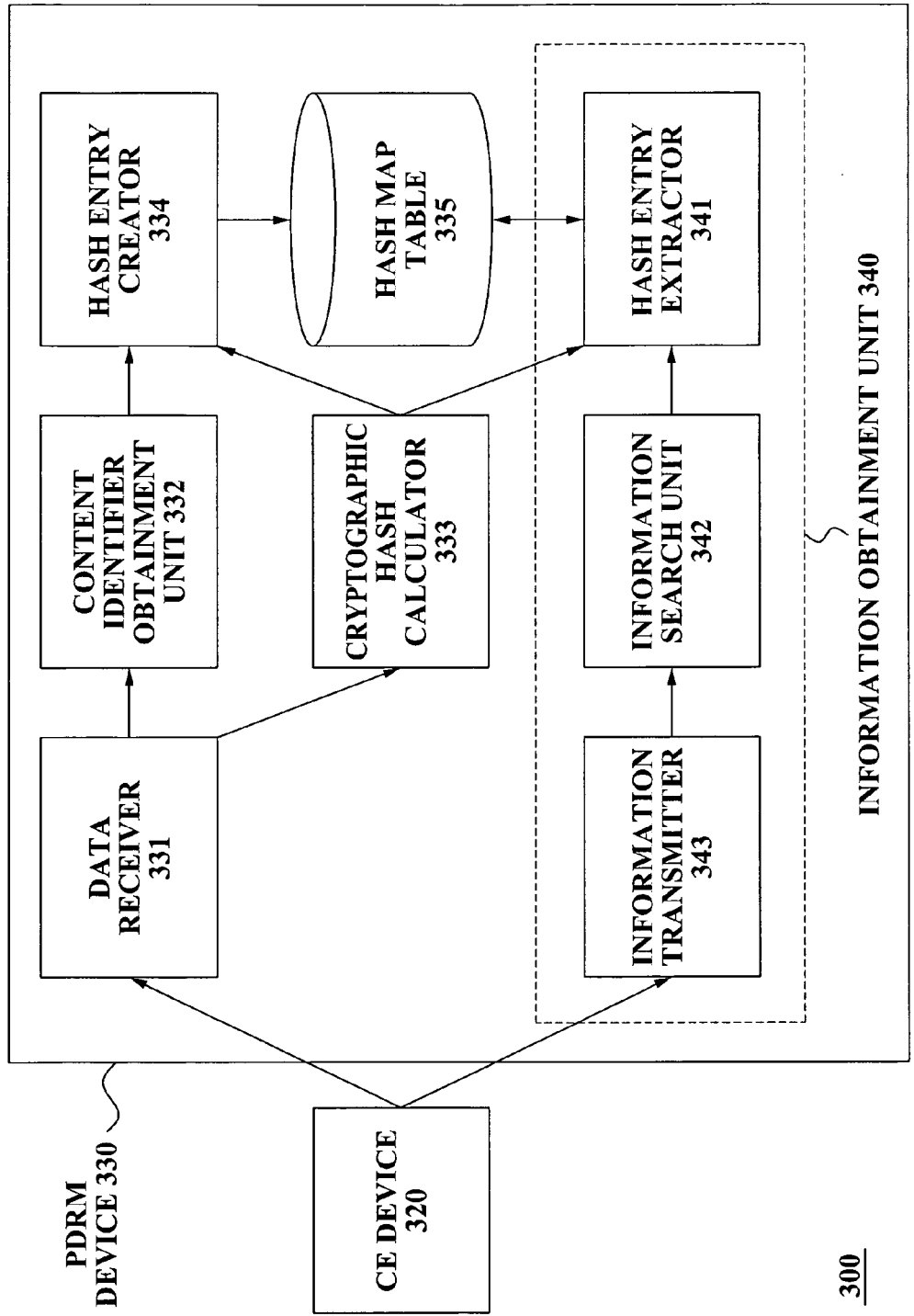
FIG. 3 is a block diagram illustrating a configuration of a system for obtaining content information according to an exemplary embodiment of the present invention.

FIG. 3 is a block diagram illustrating a configuration of a system for obtaining information about content 300 according to an exemplary embodiment of the present invention.

The system for obtaining information on the content 300 operates in an environment where a DRM agent and a rendering application are implemented in different devices respectively, and includes a PDRM device 330 with the DRM agent.

The PDRM device 330 includes a data receiver 331, a content identifier obtainment unit 332, a cryptographic hash calculator 333, a hash entry creator 334, a hash map table 335, and an information obtainment unit 340. Additionally, the information obtainment unit 340 includes a hash entry extractor 341, an information search unit 342, and an information transmitter 343.

A CE device 320 having the rendering application initially transmits first N bytes of the content to the PDRM device 330.

The receiver 331 receives the first N bytes from the CE device 320.

The content identifier obtainment unit 332 obtains a content identifier of the content by using the content. For the above operation, the content identifier obtainment unit 332 parses the content and thereby obtains the content identifier and extracted information of <start offset, end offset> corresponding to the content identifier.

The cryptographic hash calculator 333 calculates the cryptographic hash of the content.

The hash entry creator 334 creates a hash entry by mapping the cryptographic hash with the content identifier, and thereby the hash map table 335 is updated to include the created hash entry.

Subsequently, when the CE device 320 requires access to content information, the CE device 320 may quickly obtain the required information by transmitting the first N bytes of the content to the PDRM device 330.

When the CE device 320 subsequently transmits the first N bytes of the content to the PDRM device 330, the data receiver 331 receives the subsequently transmitted first N bytes from the CE device 320.

The cryptographic hash calculator 333 calculates the cryptographic hash with respect to the N bytes.

The hash entry extractor 341 searches the hash map table 335 for the hash entry by using the cryptographic hash and extracts the found hash entry. In an exemplary embodiment of the present invention, the hash entry is constructed as a list of the content identifier associated with the content.

The information search unit 342 obtains required information by using the content identifier, and the information transmitter 343 transmits the obtained information to the CE device 320.

According to exemplary embodiments of the present invention, a method and apparatus for reducing a communication time is provided, which occurs due to transmission of an encrypted content, when a DRM agent and a rendering application are implemented in different devices respectively.

Also, according to exemplary embodiments of the present invention, a method and apparatus which can avoid traffic due to unnecessary content transmission between a PDRM device and a CE device is provided. This method and apparatus thereby effectively utilizes the bandwidth between the PDRM device and the CE device.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of obtaining content information in an environment where a Digital Rights Management (DRM) agent and a rendering application are separated from each other, the method comprising:
   transmitting, by a consumer electronics (CE) device comprising the rendering application, first N bytes of the content to a portable Digital Rights Management (PDRM) device comprising the DRM agent; and
   obtaining, by the PDRM device, information about the content by using a cryptographic hash with respect to the first N bytes, and transmitting the obtained information to the CE device,
   wherein a number of bytes of the entire content is greater than a number of bytes of the first N bytes,
   wherein initially transmitting the first N bytes from the CE device to the PDRM device, further comprises: transmitting, by the CE device, the content to the PDRM device upon a request of the PDRM device;
   obtaining, by the PDRM device, a content identifier of the content by using the content; and
   creating a hash entry by mapping the cryptographic hash of the content with the content identifier,
   maintaining, by the PDRM device, a hash map table; and
   updating the hash map table to include the created hash entry;
   wherein the obtaining and the transmitting is performed when the CE device subsequently transmits the first N bytes to the PDRM device, and obtains information about the content by using the updated hash map table,
   analyzing, by the PDRM device, the subsequently transmitted first N bytes to verify whether the subsequently transmitted first N bytes are sufficient to calculate the cryptographic hash; requesting the CE device for bytes required to calculate the cryptographic hash when the subsequently transmitted first N bytes are insufficient; and transmitting, by the CE device, the required bytes to the PDRM device when the request is received from the PDRM device.

2. The method of claim 1, wherein the obtaining of the content identifier parses the content, and thereby obtains the content identifier and extracted information comprising start offset and end offset corresponding to the content identifier.

3. The method of claim 1, wherein the required bytes are determined by using an offset and size of the content.

4. The method of claim 1, wherein the obtaining and the transmitting comprises:
   calculating the cryptographic hash with respect to the subsequently transmitted first N bytes; and
   retrieving and extracting the hash entry from the hash map table by using the cryptographic hash.

5. The method of claim 1, wherein the hash entry is constructed as a list of the content identifier associated with the content, and
   the obtaining and the transmitting comprises:
   obtaining required information by using the content identifier; and
   transmitting the required information to the CE device.

6. A computer-readable recording medium having stored thereon instructions for implementing a method of obtaining information about content in an environment where a DRM agent and a rendering application are separated from each other, the instructions comprising:
   a first set of instructions for transmitting, by a CE device comprising the rendering application, first N bytes of the content to a PDRM device comprising the DRM agent; and a second set of instructions for obtaining, by the PDRM device, information about the content by using a cryptographic hash with respect to the first N bytes, and transmitting the obtained information to the CE device, wherein a number of bytes of the entire content is greater than a number of bytes of the first N bytes;

wherein initially transmitting the first N bytes from the CE device to the PDRM device, further comprises: transmitting, by the CE device, the content to the PDRM device upon a request of the PDRM device;

obtaining, by the PDRM device, a content identifier of the content by using the content; and creating a hash entry by mapping the cryptographic hash of the content with the content identifier, maintaining, by the PDRM device, a hash map table; and updating the hash map table to include the created hash entry;

wherein the obtaining and the transmitting is performed when the CE device subsequently transmits the first N bytes to the PDRM device, and obtains information about the content by using the updated hash map table, analyzing, by the PDRM device, the subsequently transmitted first N bytes to verify whether the subsequently transmitted first N bytes are sufficient to calculate the cryptographic hash; requesting the CE device for bytes required to calculate the cryptographic hash when the subsequently transmitted first N bytes are insufficient; and transmitting, by the CE device, the required bytes to the PDRM device when the request is received from the PDRM device.

7. An apparatus for obtaining content information in an environment where a DRM agent and a rendering application are separated from each other, the apparatus comprising:

a PDRM device for comprising the DRM agent, wherein the PDRM device comprises:

a data receiver for receiving first N bytes of the content from a CE device comprising the rendering application; and an information obtainment unit for obtaining information about the content by using a cryptographic hash with respect to the first N bytes and transmitting the obtained information to the CE device, and wherein a number of bytes of the entire content is greater than a number of bytes of the first N bytes;

wherein, when the first N bytes are initially transmitted from the CE device to the PDRM device, the data receiver receives the content from the CE device, and the PDRM device comprises:

a content identifier obtainment unit for obtaining a content identifier of the content by using the content;

a cryptographic hash calculator for calculating the cryptographic hash of the content; and a hash entry creator for creating a hash entry by mapping the cryptographic hash of the content with the content identifier, wherein the PDRM device further comprises a hash map table, and the hash map table is updated to include the created hash entry;

wherein, when the CE device subsequently transmits the first N bytes to the PDRM device, the information obtainment unit obtains information about the content by using the updated hash map table;

wherein: the cryptographic hash calculator calculates the cryptographic hash of the subsequently transmitted first N bytes, and the information obtainment unit retrieves and extracts the hash entry from the hash map table by using the cryptographic hash.

8. The apparatus of claim 7, wherein the content identifier obtainment unit parses the content and thereby obtains the content identifier and extracted information comprising start offset and end offset corresponding to the content identifier.

9. The method of claim 6, wherein the hash entry is constructed as a list of the content identifier associated with the content, and the information obtainment unit further comprises:

an information search unit for obtaining required information by using the content identifier; and an information transmitter for transmitting the required information to the CE device.

10. A method of obtaining content information in an environment where a Digital Rights Management (DRM) agent and a rendering application are separated from each other, the method comprising:

transmitting, by a consumer electronics (CE) device comprising the rendering application, a portion of a content to a portable Digital Rights Management (PDRM) device comprising the DRM agent; and obtaining, by the PDRM device, a content identifier corresponding with the content by using a cryptographic hash with respect to the portion, and transmitting the content identifier to the CE device, wherein a number of bytes of the entire content is greater than a number of bytes of the portion of the content;

wherein initially transmitting the first N bytes from the CE device to the PDRM device, further comprises: transmitting, by the CE device, the content to the PDRM device upon a request of the PDRM device;

obtaining, by the PDRM device, a content identifier of the content by using the content; and creating a hash entry by mapping the cryptographic hash of the content with the content identifier, maintaining, by the PDRM device, a hash map table; and updating the hash map table to include the created hash entry;

wherein the obtaining and the transmitting is performed when the CE device subsequently transmits the first N bytes to the PDRM device, and obtains information about the content by using the updated hash map table, analyzing, by the PDRM device, the subsequently transmitted first N bytes to verify whether the subsequently transmitted first N bytes are sufficient to calculate the cryptographic hash; requesting the CE device for bytes required to calculate the cryptographic hash when the subsequently transmitted first N bytes are insufficient; and transmitting, by the CE device, the required bytes to the PDRM device when the request is received from the PDRM device.

11. The method of claim 1, wherein the obtained information about the content includes a content identifier.

12. The method of claim 1, wherein the obtained information about the content includes extracted information of <start offset, end offset> corresponding to each content identifier.

* * * * *